United States Patent
Lu et al.

(10) Patent No.: US 10,452,572 B2
(45) Date of Patent: Oct. 22, 2019

(54) AUTOMATIC SYSTEM SERVICE RESOURCE MANAGEMENT FOR VIRTUALIZING LOW-LATENCY WORKLOADS THAT ARE INPUT/OUTPUT INTENSIVE

(71) Applicant: VMware, Inc., Palo Alto, CA (US)

(72) Inventors: Xunjia Lu, Saratoga, CA (US); Haoqiang Zheng, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 168 days.

(21) Appl. No.: 15/381,067

(22) Filed: Dec. 15, 2016

(65) Prior Publication Data

US 2018/0101486 A1    Apr. 12, 2018

Related U.S. Application Data

(60) Provisional application No. 62/405,040, filed on Oct. 6, 2016.

(51) Int. Cl.
| | |
|---|---|
| *G06F 13/16* | (2006.01) |
| *G06F 9/455* | (2018.01) |
| *G06F 9/48* | (2006.01) |
| *G06F 9/50* | (2006.01) |
| *G06F 15/78* | (2006.01) |

(52) U.S. Cl.
CPC ........ *G06F 13/161* (2013.01); *G06F 9/45533* (2013.01); *G06F 9/45558* (2013.01); *G06F 9/4812* (2013.01); *G06F 9/5033* (2013.01); *G06F 9/5088* (2013.01); *G06F 15/7875* (2013.01); *G06F 2009/4557* (2013.01)

(58) Field of Classification Search
None
See application file for complete search history.

(56) References Cited

U.S. PATENT DOCUMENTS

| | | |
|---|---|---|
| 9,317,318 B2 | 4/2016 | Zheng et al. |
| 9,552,216 B2 | 1/2017 | Zheng et al. |
| (Continued) | | |

OTHER PUBLICATIONS http://pubs.vmware.com/Release_Notes/en/vsphere/60/vsphere-esxi-60u1-release-notes.html.

*Primary Examiner* — Wynuel S Aquino
*Assistant Examiner* — Melissa A Headly
(74) *Attorney, Agent, or Firm* — Patterson + Sheridan, LLP

(57) ABSTRACT

An approach for providing low-latency and fast response times required by virtual machine (VM) telecommunication (telco) workloads is disclosed. In one embodiment, a kernel scheduler identifies hypervisor system contexts that are outside of traditional virtual central processing unit (CPU) contexts and servicing telco workloads. The scheduler grants each such context exclusive affinity to a respective physical CPU, up to a configurable maximum number of such grants. The scheduler also increases the CPU reservations in a system resource pool for the hypervisor by one CPU, indicating that there is one fewer physical CPU on which VMs may be placed or moved. The exclusive affinities and CPU reservations may be dynamically adjusted as, e.g., new latency-sensitive VMs are powered on with virtual CPUs that need to be granted exclusive affinity to physical CPUs or contexts no longer relevant to telco workloads are demoted to not have exclusive affinity to physical CPUs.

19 Claims, 4 Drawing Sheets

(56) References Cited

U.S. PATENT DOCUMENTS

| | | |
|---|---|---|
| 2015/0005886 A1 | 1/2015 | Pinneo |
| 2015/0055499 A1 | 2/2015 | Zheng et al. |
| 2015/0058861 A1* | 2/2015 | Zheng ................... H04L 47/56 718/104 |
| 2015/0254000 A1* | 9/2015 | Sivathanu ........... G06F 12/0868 711/103 |
| 2016/0364341 A1* | 12/2016 | Banginwar ........... G06F 12/145 |

* cited by examiner

AUTOMATIC SYSTEM SERVICE RESOURCE MANAGEMENT FOR VIRTUALIZING LOW-LATENCY WORKLOADS THAT ARE INPUT/OUTPUT INTENSIVE

CROSS-REFERENCE TO RELATED APPLICATIONS

This Application claims benefit of U.S. Provisional Patent Application Ser. No. 62/405,040 filed Oct. 6, 2016, which is incorporated herein by reference in its entirety.

BACKGROUND

Applications characterized as "latency sensitive" are, typically, highly susceptible to execution delays and jitter (i.e., unpredictability) introduced by the computing environment in which the application runs. In virtualized systems, where a virtual machine (VM) running applications shares processing resources with other virtual machines and system tasks, virtual central processing units (CPUs) of latency-sensitive VMs may be granted exclusive affinity to physical CPUs such that those physical CPUs are, effectively, dedicated to running the virtual CPUs with affinity to them. This approach minimizes the scheduling delay of virtual CPUs, which reduces the latency of CPU and memory intensive workloads running on latency-sensitive VMs.

VM workloads employed by telecommunication (telco) companies often require extremely low-latency and fast response times. However, telco workloads generally have high physical CPU demand in the networking or storage stack, i.e., they are network input/output (I/O) intensive. Further, telco workloads may require close to zero packet drop rates even with the most bursty workloads that have rapid changes in CPU demand (e.g., from 100% in one second to 1% in the next second). The networking and storage stacks have typically been implemented as hypervisor services outside of traditional virtual CPU contexts. As a result, simply granting virtual CPU contexts associated with telco workloads exclusive affinity to physical CPUs, as in the case of traditional latency-sensitive VMs, will not resolve the CPU contention experienced by the networking or storage stack contexts that can add jitter and latency negatively affecting performance.

SUMMARY

One embodiment provides, in a host computer having one or more physical central processing units (CPUs) that support execution of virtual computing instances, a method for reducing latency and jitter of an input/output (I/O) intensive workload. The method generally includes identifying a first system context of a hypervisor, the first system context servicing the I/O intensive workload which runs in one of the virtual computing instances. The method further includes assigning the identified first system context to have exclusive affinity to one of the physical CPUs, where the assigning includes migrating running tasks and directing queued tasks and interrupt processing from the one of the physical CPUs to other physical CPUs.

Further embodiments provide a non-transitory computer-readable medium that includes instructions that, when executed, enable a host computer to implement one or more aspects of the above method, and a computer system programmed to implement one or more aspects of the above method.

DETAILED DESCRIPTION

Figure 1:
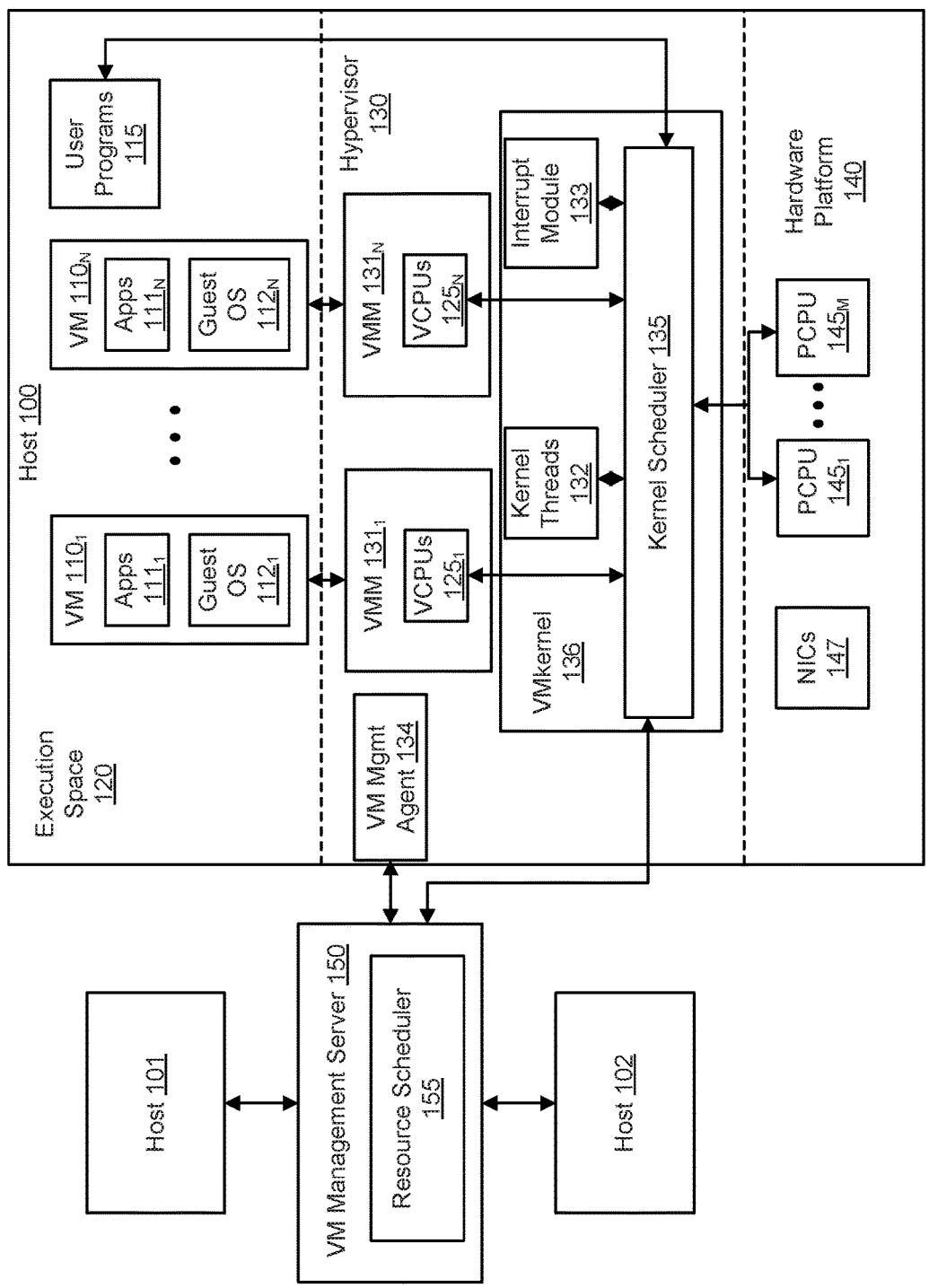
FIG. 1 is a diagram depicting a virtualized computing environment in which one or more embodiments may be implemented.

Embodiments disclosed herein relate to techniques for providing the low-latency and fast response times required by virtual machine (VM) telecommunication (telco) workloads. Although VMs running guest operating systems (OS's) and telco workloads are used herein as a reference examples, it should be understood that techniques disclosed herein are also applicable to other types of virtual computing instances, such as containers that do not include a guest OS and are supported by an abstraction layer provided on top of the host computer OS's kernel. Further, telco workloads are one example of latency-sensitive VMs that are network input/output (I/O) intensive, but it should be understood that techniques disclosed herein may be applied to any workload that has similar network, storage, or other I/O intensive characteristics and latency/quality-of-service requirements. That is, techniques disclosed herein are not specific to networking heavy workloads or networking I/O workloads and may also be used with other types of I/O intensive workloads such as storage I/O intensive workloads. In one embodiment, a hypervisor kernel scheduler is configured to identify "system" contexts of hypervisors, i.e., hypervisor contexts outside of traditional virtual central processing unit (CPU) contexts associated with VMs, that are servicing I/O intensive workloads. Work or CPU time consumed outside of traditional virtual CPU contexts are also referred to herein as system services, and system services typically require the same level but more flexible quality of service. The kernel scheduler may make identifications of system service contexts (system contexts) servicing I/O intensive workloads automatically based on the system contexts that have high communication rates with virtual CPUs or that are associated with high CPU loads, semi-automatically based on system contexts having high communication rates with virtual CPUs or high CPU loads and known relationships between contexts, manually based on user-specified system contexts that the I/O intensive workloads rely on, or a combination of these approaches. The kernel scheduler then grants each identified system context exclusive affinity to a respective physical CPU, which may include migrating running tasks from that physical CPU to other physical CPUs as well as directing queued tasks and interrupt processing from that physical CPU to other physical CPUs. Physical CPUs, as used herein, refer to individual cores, such as the cores of multi-core CPUs, where no hyperthreading is enabled and to individual hyperthreads in hyper-threaded cores. In addition to granting exclusive affinities, the kernel scheduler may also increase the CPU reservation in a system resource pool for the hypervisor by one CPU, thereby indicating that there is one fewer physical CPU on which VMs may be placed or moved. The exclusive affinities and CPU reservations may also be dynamically adjusted as, e.g., new latency-sensitive VMs are powered on with virtual CPUs that need to be granted exclusive affinity to physical CPUs, or system contexts which are no longer relevant to I/O intensive workloads are demoted to not have exclusive affinity to physical CPUs.

FIG. 1 depicts a virtualized computing environment in which one or more embodiments may be implemented. As shown, the computing environment includes a host computer 100 and a virtual machine (VM) management server 150. VM management server 150 communicates with host computer 100 over a local connection or, alternatively, over a remote network connection (not shown).

Host computer 100 is, in embodiments, a general-purpose computer that supports the execution of an operating system and one more application programs therein. In order to execute the various components that comprise a virtualized computing platform, host computer 100 is typically a server class computer. However, host computer 100 may also be a desktop or laptop computer. As shown, host computer 100 is logically divided into three different components. First, execution space 120 supports the execution of user-level (i.e., non-kernel level) programs. User-level programs are non-privileged, meaning that they cannot perform certain privileged functions, such as executing privileged instructions or accessing certain protected regions of system memory. Among the programs that execution space 120 supports are virtual machines and user programs.

Virtual machines are software implementations of physical computing devices and execute programs much like a physical computer. In embodiments, a virtual machine implements, in software, a computing platform that supports the execution of software applications under the control of a guest OS. As such, virtual machines typically emulate a particular computing architecture. In FIG. 1, execution space 120 includes VMs $110_1$-$110_N$. Each VM 110 shown supports the execution of one or more applications 111, each of which executes under the control of a particular guest OS 112. Applications 111 are user-level (non-kernel) programs, such as, for example, word processors or spreadsheet programs. Each of the depicted guest OS 112 may be one of the well-known commodity operating systems, such as any of the versions of the Windows® operating system from Microsoft Corp., the Linux® operating system, or MacOS® X from Apple, Inc. It should be understood that the applications and guest OS may vary from one VM to another. Thus, applications $111_1$ in VM $110_1$ may include Microsoft's Word® and Excel® applications running under the control of Windows® 7 as guest OS $112_1$. By contrast, applications $111_N$ in VM $110_N$ may include the Safari® web browser running under the control of MacOS® X as guest OS $112_N$.

In addition to virtual machines $110_1$-$110_N$, execution space 120 includes one or more user programs 115. In embodiments, user programs 115 are software components that execute independent of any virtual machine. Examples of user programs 115 include utilities that perform various system-oriented functions, such as facilitating communication with the kernel, providing directory services, and the like. Such programs, like virtual machines, execute at the user level, meaning that these programs cannot perform certain privileged (kernel-level) functions. As shown, each of VMs $110_1$-$110_N$ and user programs 115 communicates with a hypervisor component, referred to herein as hypervisor 130.

Hypervisor 130 provides the operating system platform for running processes on computer host 100. Hypervisor 130 controls all hardware devices within computer host 100 and manages system resources for all applications running therein. Among the core functions that hypervisor 130 provides are console services, file system services, device drivers, and resource scheduling. Further, hypervisor 130 implements software components that provide for the instantiation of one or more virtual machines on the host computer.

As shown, hypervisor 130 includes virtual machine monitors (VMMs) $131_1$-$131_N$. Each VMM 131 corresponds to an executing VM 110. Thus, VMM $131_1$ corresponds to VM $110_1$, VMM $131_2$ corresponds to VM $110_2$, and so on. Each VMM 131 is a software layer that provides a virtual hardware platform to the guest OS for the corresponding virtual machine. It is through a particular VMM 131 that a corresponding VM accesses services provided by the kernel component of hypervisor 130 (shown in FIG. 1 as kernel 136). Among the functions carried out by kernel 136 are memory management, providing networking and storage stacks, and process scheduling.

Each VMM 131 implements a virtual hardware platform for the corresponding VM 110. Among the components of the implemented virtual hardware platform are one or more virtual central processing units (or virtual CPUs) 125. Thus, VMM $131_1$ implements a first set of virtual CPUs $125_1$, VMM $131_2$ implements a second set of virtual CPUs $125_2$, and so on. Each virtual CPU 125 appears to be a physical CPU from the standpoint of the applications 111 and the guest OS 112 that run in the corresponding VM 110. In this way, a virtualized guest operating system that runs within a virtual machine may schedule and dispatch processes for execution on one or more virtual CPUs in the same way that an operating system that runs directly on a computer host (i.e., in a non-virtualized manner) schedules and dispatches processes for execution on physical CPUs. However, from the standpoint of hypervisor 130 (which, in typical embodiments, executes directly on computer host 100), each virtual CPU 125 is a process to be scheduled and dispatched on a physical CPU of computer host 100.

In one or more embodiments, kernel 136 serves as a liaison between VMs 110 and the physical hardware of computer host 100. Kernel 136 is a central operating system component, and executes directly on host 100. In embodiments, kernel 136 allocates memory, schedules access to physical CPUs, and manages access to physical hardware devices connected to computer host 100.

As shown, kernel 136 executes one or more kernel threads 132. Kernel threads 132 are processes that perform operating system functions, such as memory and device management, and which execute in a privileged mode (as opposed to user programs 115, described earlier, which execute in a non-privileged mode). In one embodiment, kernel threads 132 include hypervisor system contexts which service telco workloads, such as system contexts that process transmitted (TX) and received (RX) packets. A context may generally represent different software constructs, depending on the underlying system. For example, a context may be a process associated with an application or a thread that is associated with a process, and "contexts" may be a set of processes associated with a parallel application or a collection of threads associated with a process. As discussed, system contexts are used herein to refer to contexts of the hypervisor that are outside of traditional virtual CPU contexts associated with virtual machines, and some system contexts can service I/O intensive workloads. Telco workloads are used herein as an example of latency-sensitive VMs that are network input/output (I/O) intensive, but techniques disclosed herein may be applied to any workload that has similar network, storage, or other I/O intensive characteristics and latency/quality-of-service requirements. The system contexts servicing telco workloads may be granted exclusivity affinity to respective physical CPUs to minimize latency and jitter, as discussed in greater detail below. Kernel 136 also includes an interrupt module 133. According to embodiments, interrupt module 133 (which may also be referred to as an interrupt handler) comprises one or more operating system functions, whose execution is triggered by the detection of an interrupt, such as those generated by hardware devices. Interrupt module 133 includes several types of interrupt handlers, which respond to interrupts generated by a particular hardware device or software module. Each interrupt handler in interrupt module 133 runs as a kernel-level process, much like kernel threads 132.

Kernel 136 also includes a kernel scheduler 135. Kernel scheduler 135 is responsible for scheduling tasks for execution on the physical CPUs of computer host 100. It should be noted that all tasks that execute on computer host 100 must share its underlying hardware resources. This includes random access memory, external storage, and processing time on the physical CPUs. Thus, the tasks that kernel scheduler 135 schedules for processing include virtual CPUs 125 (which are the virtual CPUs of executing VMs), user programs 115, kernel threads 132, and interrupt handlers that execute as part of interrupt module 133. Indeed, as shown in FIG. 1, each of these process types is depicted as feeding into kernel scheduler 135. In embodiments, kernel scheduler 135 maintains a separate run queue for each physical CPU (not shown). That is, kernel scheduler 135 schedules a process for execution on a particular physical CPU by placing that process in the run queue for that particular physical CPU. Typically, a physical CPU only selects processes from its own queue for execution thereon.

In one embodiment, kernel scheduler 135 dynamically identifies system contexts that are servicing telco workloads (e.g., system contexts for processing network TX/RX) and grants each such system context exclusive affinity to a respective physical CPU. In such a case, kernel scheduler 135 may further increase the CPU reservation in a system resource pool for the hypervisor by one CPU to indicate that there is one fewer physical CPU on which VMs may be placed or moved. The process by which kernel scheduler 135 identifies system contexts servicing telco workloads and grants or revokes exclusive affinity to physical CPUs is described more fully below.

FIG. 1 also depicts hardware platform 140, which is another component of computer host 100. Hardware platform 140 includes all physical devices, channels, and adapters of computer host 100. Hardware platform 140 includes network adapters (not shown), for network communication, as well as host bus adapters (HBAs) (not shown) which enable communication to external storage devices. In addition, hardware platform 140 includes the physical CPUs of computer host 100. As shown in FIG. 1, computer host 100 has M physical CPUs $145_1$-$145_M$. As shown the figure, kernel scheduler 135 schedules and dispatches tasks for execution on one or more physical CPUs 145.

Hardware platform 140 also includes a random access memory (RAM) 141, which, among other things, stores programs currently in execution, as well as data required for such programs. For example, the run queues that kernel scheduler 135 maintains for each physical CPU are typically maintained in RAM 141.

In order to support the configuration, identification, and scheduling changes needed for executing highly latency sensitive virtual machines and load balancing the virtual machines across host computers, the embodiment depicted in FIG. 1 includes a VM management server 150. VM management server 150 is, in embodiments, a server application executing either within computer host 100, or (as shown in FIG. 1) remotely from computer host 100. Embodiments of VM management server 150 provide an interface (such as a graphical user interface (or GUI)) through which a system administrator may define, configure, and deploy virtual machines for execution on one or more host computers. As shown, VM management server 150 includes a resource scheduler 155 that is specifically responsible for placing and load balancing VMs across the host computers (e.g., hosts 100, 101, and 102).

As shown in FIG. 1, VM management server 150 communicates with computer host 100, either through a direct local connection or over a computer network. In order to facilitate such communication, VM management agent 134 executes on computer host 100. Although VM management agent 134 is not part of kernel 136, embodiments of the agent run at the hypervisor level within hypervisor 130. However, in other embodiments, VM management agent 134 may run as a user program within execution space 120. It should be noted that the processes of VM management agent 134 are also scheduled for execution by kernel scheduler 135. VM management agent 134 receives instructions from VM management server 150 and carries out tasks on behalf of VM management server 150. Among the tasks performed by VM management agent 134 are configuration and instantiation of virtual machines.

Figure 2:
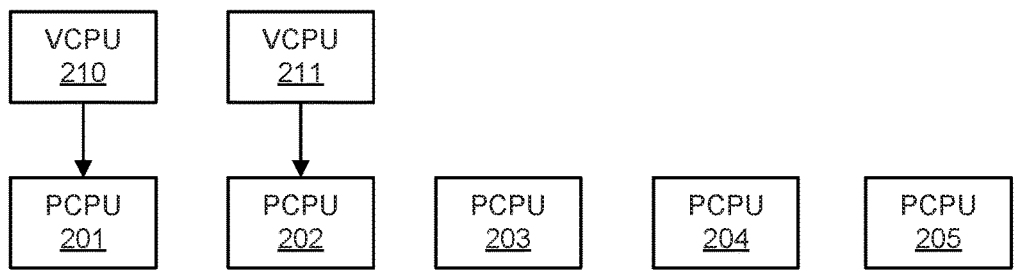
FIG. 2 shows an approach for granting virtual CPUs and system services exclusive affinity to physical CPUs, according to an embodiment.
Figure 2:
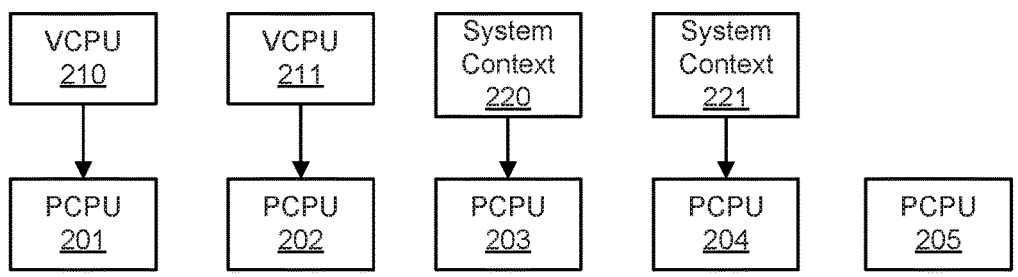
Figure 2:
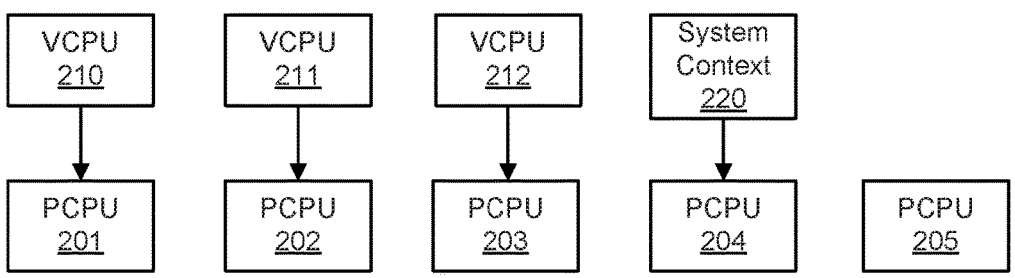

FIG. 2 shows an approach for granting virtual CPUs and system services exclusive affinity to physical CPUs, according to an embodiment. As shown in panel A, kernel scheduler 135 first grants virtual CPUs 210 and 211, which belong to latency-sensitive VM(s), exclusive affinity to physical CPUs 201 and 202. In one embodiment, the virtual CPUs of latency-sensitive VMs may be guaranteed exclusive affinity to physical CPUs to reduce the latency of CPU and memory intensive workloads running on latency-sensitive VMs. For example, kernel scheduler 135 may identify such latency-sensitive VMs using a latency sensitivity table which defines latency sensitivity characteristics of VMs and is maintained by VM management server 150. Kernel scheduler 135 may then grant virtual CPUs of the identified latency-sensitive VMs exclusive affinity to respective physical CPUs. This approach for granting latency-sensitive VMs exclusive affinity to physical CPUs based on latency sensitive tables is disclosed in U.S. Pat. No. 9,262,198, entitled "CPU Scheduler Configured to Support Latency Sensitive Virtual Machines," which is incorporated by reference in its entirety herein. The result of granting exclusive affinity to a physical CPU is the physical CPU effectively becomes dedicated to running a particular virtual CPU.

As shown in panel B, after granting virtual CPUs 210 and 211 of latency-sensitive VMs exclusive affinity to physical CPUs 201 and 202, kernel scheduler 135 also grants system contexts 220 and 221 which are relevant to telco workloads exclusive affinity to physical CPUs 203 and 204. As discussed, system contexts are contexts of services that are not native to VM execution and are instead handled exclusively by the hypervisor. Similar to granting of exclusive affinity for virtual CPUs discussed above, granting system contexts 220 and 221 exclusive affinity to physical CPUs 220 and 221 includes moving other contexts off of physical CPUs 220 and 221 and effectively dedicating physical CPUs 220 and 221 to running system contexts 220 and 221, respectively. In particular, kernel scheduler 135 will refrain from scheduling any other processes for execution on the physical CPU to which the system context has exclusive affinity, even when the physical CPU is in an idle state. In addition, kernel scheduler 135 may refrain from scheduling most interrupt processing on the physical CPU and instead schedule and dispatch interrupt processing on other physical CPUs without exclusive affinity. This resolves the CPU contention problem discussed above in which the system contexts servicing telco workloads, such as the networking or storage stack contexts, traditionally had to share physical CPUs with other threads placed on the same CPUs, causing latency and jitter as the system contexts had to wait for the other threads to run at times.

In embodiments, kernel scheduler 135 may identify system contexts that are relevant to telco workloads automatically based on the system contexts having high communication rates with virtual CPUs and the system contexts associated with high CPU loads, semi-automatically based on the systems contexts with high communication rates with virtual CPUs or high CPU loads and known relationships between contexts, manually based on user-specified system contexts that the telco workloads rely on, or a combination of these approaches, as discussed in greater detail below. Examples of system contexts relevant to telco workloads include the vmnic-poll and Networld/Worldlet contexts, which serve as the physical network interface card (NIC) context responsible for processing packets received from the physical NIC and communicating with VMs and as the virtual NIC context responsible for processing packets being sent from VMs to the physical NIC, respectively. It should be understood that physical NIC hardware is generally shared between VMs, and the queues associated with physical NICs are processed by CPUs. After identifying relevant system contexts, kernel scheduler 135 grants one or more of the identified contexts exclusive affinity to available physical CPUs, such as physical CPUs 220 and 221. In addition to granting exclusive affinity to physical CPUs, kernel scheduler 135 may also increase the CPU reservation of the host in, e.g., a "system" resource pool for reserving hypervisor resources, by 100% of a CPU, thereby notifying VM management server 150 that there is one fewer physical CPU on which VMs may be placed or moved.

In one embodiment, a user is permitted to configure (e.g., via a user interface) the maximum number of system contexts that kernel scheduler 135 can grant exclusive physical CPU affinity to for a VM. Illustratively, one physical CPU 205 is reserved for typical system contexts, while the user has configured the maximum number of system contexts with exclusive CPU affinity to be two. As a result, kernel scheduler 135 will only grant up to two system contexts relevant to telco workloads (shown as system contexts 220 and 221) exclusive affinity to physical CPUs.

As shown in panel C, when another latency-sensitive VM having virtual CPU 212 is powered on, kernel scheduler 135 also grants virtual CPU 212 exclusive access to one of the physical CPUs. As discussed, virtual CPUs of latency-sensitive VMs are guaranteed exclusive affinity to virtual CPUs. By contrast, system contexts relevant to telco workloads have lesser priority and may be granted exclusive affinity to physical CPUs in a best-effort manner, without a guarantee that any system context will be granted such exclusive affinity. In addition, when new latency-sensitive VMs are powered on, kernel scheduler 135 may abort previous exclusive affinity reservations to system contexts if there are not enough available physical CPUs for the new latency-sensitive VM as a result of system contexts being granted exclusive affinity to physical CPUs. In one embodiment, all of the exclusive affinities granted to system contexts may be aborted. In an alternative embodiment, kernel scheduler 135 may abort the number of exclusive affinities granted to system contexts needed to grant exclusive affinity to virtual CPUs of the new latency-sensitive VM. Illustratively, system contexts 220 and 221 had exclusive affinity to physical CPUs 203 and 204, and there are no remaining available physical CPUs to grant the virtual CPUs of a new latency-sensitive VM exclusive affinity to. As a result, kernel scheduler 135 aborts the exclusive physical CPUs of system contexts 220 and 221 so that the latency-sensitive VM can be powered on successfully and its virtual CPU 212 granted exclusive affinity to physical CPU 203. Then, kernel scheduler 135 grants system context 220 exclusive affinity to the one remaining available CPU 204.

Figure 3:
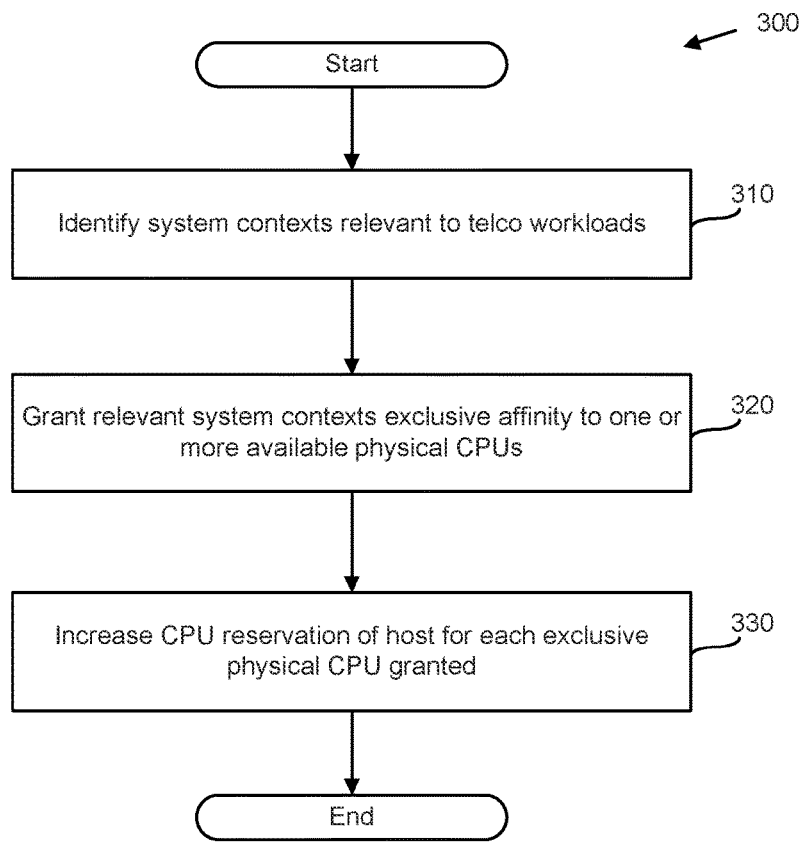
FIG. 3 is a flow diagram depicting a method for granting system services associated with a telecommunication workload exclusive affinity to one or more physical CPUs, according to an embodiment.

FIG. 3 is a flow diagram depicting a method 300 for granting system services associated with a telecommunication workload exclusive affinity to one or more physical CPUs, according to an embodiment. As shown, method 300 begins at step 310, where kernel scheduler 135 identifies system contexts that are relevant to telco workloads. Although shown as one step in method 300, it should be understood that kernel scheduler 135 may identify relevant system contexts periodically and then update the exclusive affinities granted to physical CPUs, as appropriate. For example, a VM may have 8 virtual NICs configured, each with an associated Networld/Worldlet system context responsible for processing packets being transmitted (TX) by the VM, and the host computer may also have 4 physical NICs installed, each with an associated vmnic-poll system context for processing received (RX) packets from the physical NIC. In such a case, kernel scheduler 135 would need to identify, on a periodic basis, which of the 12 system contexts are involved in processing packets for telco workloads.

In one embodiment, kernel scheduler 135 may identify system contexts relevant to telco workloads automatically based on the intensity of communications between the contexts and virtual CPU threads in terms of, e.g., communications per second, and based on high CPU loads associated with system contexts. Experience has shown that contexts relevant to telco workloads often have high communication rates with one or multiple virtual CPU threads and high CPU loads. Communications between system contexts and virtual CPU threads may be detected by, e.g., monitoring wait/wakeup inter-processor interrupts (IPIs) or receiving information on the communications from drivers. To identify high communication rates indicative of relevant contexts, kernel scheduler 135 keeps track of communication rates between all system contexts and virtual CPU worlds of the VMs, and kernel scheduler 135 then filters out relevant contexts that are considered part of the telco workload when the communication rate of the context exceeds a predefined threshold. For example, the threshold may specify that relevant contexts should communicate with a virtual CPU more than a given number of times per second. It should be understood that if no recent communication is detected between a system context and any virtual CPUs, then the communication rate for that system context will decay exponentially until the context is eventually irrelevant.

Kernel scheduler 135 may also identify system contexts relevant to telco workloads based on a combination of the intensity of communication between the contexts and virtual CPU threads or CPU load and hints provided to kernel scheduler 135 by the system layer. This approach for identifying relevant contexts applies to cases in which a virtual CPU thread communicates with a system context that is linked to other system context(s). For example, to send a packet, the virtual CPU thread may communicate with a polling thread, which is a system context that itself communicates with a kernel networking context, which is another system context. In such a case, kernel scheduler 135 can identify the polling thread as relevant to a telco workload if the intensity of communication between the polling thread and the virtual CPU thread is above a threshold. However, kernel scheduler 135 will need additional information, such as system context relationship information provided by a networking stack, I/O stack, device driver, etc. (e.g., the code implementing the networking logic may inform kernel scheduler 135 that context A is related to context B), to identify that the kernel networking context is also part of the same service servicing the virtual CPU and thus relevant to the telco workload. It should be understood that unless the kernel networking context is identified and also granted exclusive affinity to a physical CPU, the kernel networking context may experience contention when packets sent by the virtual CPU via the polling thread are being processed by the kernel networking context, and this can cause undesirable latency and jitter. That is, in order to ensure low latency and jitter for the telco workload, both the polling thread that can be identified as a relevant context based on a high communication rate with a virtual CPU thread or high CPU load, as well as related system contexts such as the kernel networking context, need to be granted exclusive affinity to respective CPUs.

In addition, kernel scheduler 135 may identify system contexts relevant to telco workloads based on relationship information provided by a user, i.e., manual relationships between relevant system contexts and virtual CPUs of VMs. For example, a user may program a virtual NIC driver to make an application programming interface (API) call to kernel scheduler 135 indicating that a particular system context may be heavily related to a VM. In such a case, kernel scheduler 135 may then identify the system context as relevant if its CPU load exceeds a predefined threshold, indicating that the context is actually busy processing services.

In another embodiment, the user may inform the hypervisor which virtual device is involved in I/O latency-sensitive workloads (which may be, e.g., network, storage, etc. I/O intensive workloads) by tagging those virtual devices in, e.g., the VM's configuration file, and kernel scheduler 135 will only consider exclusive affinity for all the contexts related to the tagged virtual devices. That is, the tagging provides a hint to kernel scheduler 135 about whether exclusive physical CPU affinity should be considered for contexts associated with the virtual devices or not, and, with the hint, kernel 135 scheduler will only look for candidates for exclusive physical CPU affinity among the contexts that are tagged, i.e. contexts that belong to tagged virtual devices. It should be understood that belonging to a tagged virtual device will then be a pre-requisite to the automatic, semi-automatic, and manual identification of relevant contexts, discussed above, to which exclusive physical CPU affinity may be granted. For example, if a VM has four configured virtual NICs, two of which are doing I/Os with a low-latency requirement and one of which is doing management layer traffic such as login, etc., the user may tag the two NICs in the VM's configuration file. Then, kernel scheduler 135 will retrieve this information and only consider exclusive affinity for contexts related to the two tagged NICs. This per-device tagging mechanism provides another channel of resource configuration for system contexts and simplifies configuration for telco workloads. In yet another embodiment, tagging may occur on a per-device queue level, giving a finer-grained control when a device has multiple queues. Each device or each device queue may have one or more associated contexts, and tagging a device or device queue may give the flexibility to distinguish among different requirement classes of quality of service at a user visible level.

In one embodiment, kernel scheduler 135 may build a tree, which is an internal data structure that includes relation nodes representing VMs and contexts and further indicates relationships (i.e., links to siblings or parents) between the contexts based on the automatic, semi-automatic, and manual identification of relevant context discussed above. In such a case, the relationships between nodes may include nodes that send and/or receive information from other nodes, and kernel scheduler 135 may walk the tree to iteratively check whether a VM's virtual CPU is related to the various system contexts and the importance of the relationships in terms of communication rates with the virtual CPU and CPU loads to determine whether system contexts are relevant to telco workloads.

At step 320, kernel scheduler 135 grants the relevant system contexts identified at step 310 exclusive affinity to one or more available CPUs. Having identified the system context(s) relevant to telco workloads, the latency and jitter of such system context(s) need to be minimized in order to achieve the high quality of service required by typical telco workloads. To minimize latency and jitter, kernel scheduler 135 "pins" identified system contexts relevant to telco workloads to respective physical CPUs, while moving other contexts out from those CPUs. That is, kernel scheduler 135 migrates running tasks from the physical CPUs to other physical CPUs. Kernel scheduler 135 also directs queued tasks and interrupt processing from that physical CPU to other physical CPUs. Thereafter, the physical CPU is, effectively, dedicated to running the pinned system context. System workloads involved in telco workloads may include worlds, where a "world" is used herein to refer to a process running on kernel 136. In one embodiment, kernel scheduler 135 may set the exclusive affinity of a relevant context that is a world directly to a selected physical CPU, while moving other, irrelevant contexts off of the selected physical CPU.

In one embodiment, relevant contexts may be constrained to be placed in the same LLC (last-level-cache) or Non-Uniform Memory Access (NUMA) domain as the virtual CPU threads that they are servicing. A NUMA system typically has multiple memory proximity domains, also referred to as "NUMA nodes," each of which has a group of processors and memory. Placing the relevant context in the same LLC or NUMA domain ensures that memory accesses are not remote, which may be slower and subject to contention across NUMA nodes. To place the relevant context in the same LLC or NUMA domain, kernel scheduler 135 selects a physical CPU that is on the same proximity domain as the communicating virtual CPU world, and then kernel scheduler 135 grants the relevant context exclusive affinity to the selected physical CPU. It should be understood, however, that a VM is not limited to a single NUMA node. For example, one virtual CPU of a VM and an associated system context may operate on one NUMA domain and another virtual CPU and system context may operate on a different NUMA domain to maximize memory bandwidth throughput.

At step 330, kernel scheduler 135 increases the CPU reservation of an appropriate host for each exclusive physical CPU affinity granted at step 320. Without increasing the CPU reservation, VM management server 150 would not be aware of the exclusive affinity that was granted, and VM management server 150 may attempt to either place a new VM on the same physical CPU or move an existing VM on to the same physical CPU for load balancing purposes. In one embodiment, kernel scheduler 135 may increase the "system" resource pool reservation associated with the hypervisor by 100% of a physical CPU to notify VM management server 150 that there is one less physical CPU on which VMs may be placed. Although discussed herein with respect to the system resource pool, it should be understood that generally the reservation of any world may be increased by 100% of a physical CPU to indicate that there is one less available physical CPU.

It should be understood that the assigned exclusive affinities to physical CPUs may be dynamically adjusted as, e.g., workloads become idle and network traffic disappears, and the system pool reservation may also be updated when the number of exclusive physical CPUs assigned to system contexts is changed. For example, if an exclusive physical CPU is granted to a system context that later becomes irrelevant to telco workloads based on the same automatic, semi-automatic, or manual criteria for determining relevance discussed above, then kernel scheduler 135 will decrease the system pool CPU reservation by 100% of a CPU to indicate that one physical CPU has been freed up, and exclusivity of the system service will also be demoted. Doing so allows other virtual CPUs or system services to run on the freed CPU.

Figure 4:
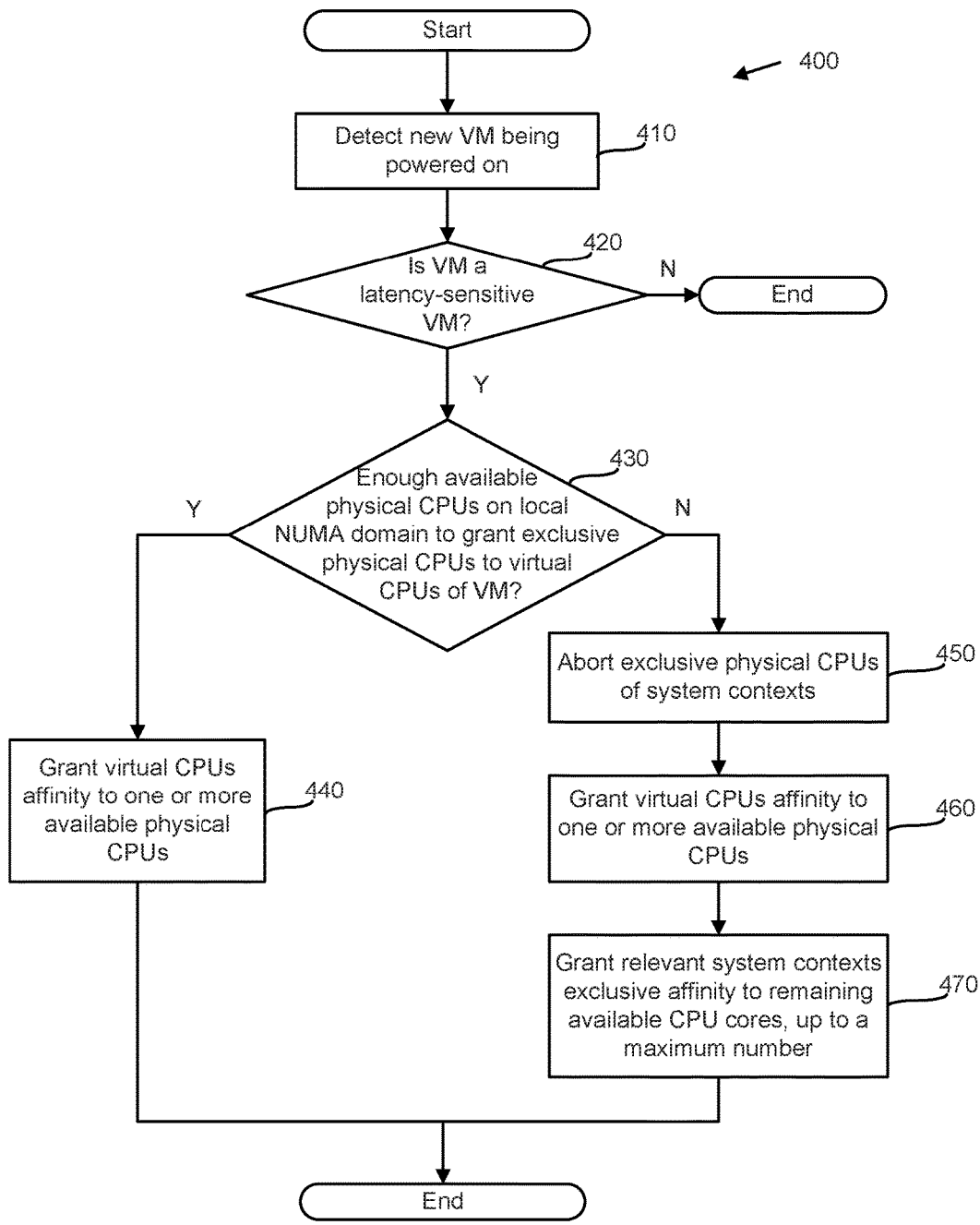
FIG. 4 is a flow diagram depicting a method 400 for granting virtual CPUs and system contexts relevant to telecommunication workloads exclusive affinity to physical CPUs, according to an embodiment.

FIG. 4 is a flow diagram depicting a method 400 for granting virtual CPUs and system contexts relevant to telecommunication workloads exclusive affinity to physical CPUs, according to an embodiment. As shown, method 400 begins at step 410, where kernel scheduler 135 detects (or is notified) that a new VM has been powered on. At step 420, kernel scheduler 135 determines whether the new VM is a low latency VM. As discussed, kernel scheduler 135 may identify VMs with high latency sensitivity using a latency sensitivity table which defines latency sensitivity characteristics of VMs and is maintained by VM management server 150, which is described in greater detail in U.S. Pat. No. 9,262,198, entitled "CPU scheduler configured to support latency sensitive virtual machines." In the case of telco workloads, the VM running the telco workload(s) should be configured as a VM with high latency sensitivity.

If the new VM is a normal, as opposed to a latency-sensitive VM, then kernel scheduler 135 takes no further action, and method 400 ends. If, on the other hand, the new VM is a latency-sensitive VM, then at step 430, kernel scheduler 135 determines if there are enough available CPUs on a local NUMA domain to grant virtual CPUs of the new VM exclusive affinity to. Each NUMA domain includes one or more physical CPUs, some of which may have previously been assigned exclusive affinity (e.g., to other latency-sensitive VMs) or are otherwise unavailable. The kernel scheduler 135 determines at step 430 whether there are enough remaining available CPUs to grant exclusive affinity to virtual CPUs of the new latency-sensitive VM.

If kernel scheduler 135 determines that there are enough available CPUs of the local NUMA domain at step 430, then at step 440, kernel scheduler 135 grants the virtual CPUs of the new VM exclusive affinity to one or more of the available CPUs. As discussed, when a virtual CPU of a virtual machine has exclusive affinity to a physical CPU, the physical CPU is, effectively, dedicated to running that particular virtual CPU.

If, however, kernel scheduler 135 determines that there are not enough available physical CPUs on the local NUMA domain to grant the virtual CPUs of the new VM exclusive affinity to, then at step 450, kernel scheduler 135 aborts the grants of exclusive affinity to CPUs to system contexts. This assumes that there are system contexts relevant to telco workloads that have been granted exclusive affinity to physical CPUs. Assuming such exclusive affinity, no other VMs are able to be placed on physical CPUs that are assigned to be exclusive to such system contexts. In order to guarantee that latency-sensitive VMs have exclusive affinity to physical CPUs, kernel scheduler 135 aborts the exclusive physical CPUs of system contexts when a low-latency VM is trying to power on with exclusive affinity on the local NUMA domain but there are no available physical CPUs due to exclusive affinity being granted to system context(s). As discussed, kernel scheduler 135 may abort all of the exclusive affinities granted to system contexts or, alternatively, kernel scheduler 135 may abort the number of exclusive affinities granted to system contexts needed to grant exclusive affinity to virtual CPUs of the new latency-sensitive VM.

At step 460, kernel scheduler 135 grants virtual CPUs of the new VM exclusive affinity to one or more of the available physical CPUs. This step is similar to step 440, discussed above, except that the exclusive affinity is granted to physical CPUs previously exclusive to system contexts.

Then at step 470, kernel scheduler 135 grants relevant system contexts exclusive affinity to remaining physical CPUs that are still available, up to a predefined maximum number. As discussed, the policy that system contexts relevant to telco workloads are granted exclusive affinity to physical CPUs is only best-effort by default. If there are no more available reservations or free CPUs for exclusive affinity when a system context becomes relevant, no action will be taken. This is in contrast to the guaranteed exclusive affinity for virtual CPUs of latency-sensitive VMs, which have higher priority than system contexts relevant to telco workloads. In one embodiment, the user is also permitted to configure the maximum number of exclusive system contexts a VM can have at any given point in time. In such a case, the kernel scheduler 135 grants relevant system contexts exclusive affinity to remaining available physical CPUs up to the user-configured maximum number.

Advantageously, techniques disclosed herein dynamically identify hypervisor system contexts servicing telecommunication workloads in VMs and grant those contexts exclusive affinity to physical CPUs. Doing so helps minimizes contention on CPU resources that would otherwise arise from running the telco-related contexts along with other threads on the same physical CPU. As a result, latency and jitter experienced by the telecommunication workloads may be reduced, and a higher percentage of the line rate achieved for transmission (TX) and receipt (RX). In addition, exclusive affinity to physical CPUs is dynamically managed according to changes in resource demand, such as that resulting from bursty workloads, while providing desired quality of services.

Certain embodiments as described above involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a host computer having a plurality of physical central processing units (CPUs) that support execution of virtual computing instances, a method for reducing latency and jitter of an input/output (I/O) intensive workload, comprising:

identifying a first system context which is a hypervisor context distinct from virtual CPU contexts associated with the virtual computing instances and which services the I/O intensive workload that runs in one of the virtual computing instances;

responsive to determining that a predefined maximum number of system contexts that can be assigned to have exclusive affinity to the physical CPUs has not been exceeded:

assigning the identified first system context to have exclusive affinity to one of the physical CPUs, wherein the assigning includes migrating running tasks and directing queued tasks and interrupt processing from the one of the physical CPUs to at least one other physical CPU of the physical CPUs, and increasing a CPU reservation associated with the host computer by one physical CPU; and responsive to determining that the predefined maximum number of system contexts that can be assigned to have exclusive affinity to the physical CPUs has been exceeded:

not assigning the identified first system context to have exclusive affinity to any of the physical CPUs.

2. The method of claim 1, wherein identifying the first system context that services the I/O intensive workload includes determining that a communication rate of the first system context with a virtual CPU is greater than a predefined threshold or determining that a CPU load associated with the first system context is greater than a predefined threshold.

3. The method of claim 1, wherein identifying the first system context that services the I/O intensive workload includes determining that the first system context is related to a second system context which is a hypervisor context whose communication rate with a virtual CPU is greater than a predefined threshold or whose associated physical CPU load is greater than a predefined threshold.

4. The method of claim 1, wherein identifying the first system context that services the I/O intensive workload includes:
receiving, from a driver, a notification of the first system context as being related to a virtual CPU; and
determining that a physical CPU load associated with the first system context is greater than a predefined threshold.

5. The method of claim 1, wherein the first system context is identified based on an associated virtual device or virtual device queue being tagged as involved in an I/O latency-sensitive workload.

6. The method of claim 1, wherein:
the CPU reservation associated with the host computer is a hypervisor resource pool allocation for the host computer; and
the hypervisor resource pool is used by a management application to make virtual computing instance placement decisions.

7. The method of claim 1, wherein assigning the first system context exclusive affinity to the one of the physical CPUs places the first system context in a same last-level-cache (LLC) or Non-Uniform Memory Access (NUMA) domain as a virtual CPU to which the first system context communicates.

8. The method of claim 1, further comprising, responsive to determining that a new latency-sensitive virtual computing instance cannot be placed as a result of the first system context's exclusive affinity to the one of the physical CPUs:
demoting the first system context to not have exclusive affinity to the one of the physical CPUs; and
assigning a virtual CPU of the new latency-sensitive virtual computing instance to have exclusive affinity to the one of the physical CPUs.

9. The method of claim 1, further comprising, responsive to identifying that the first system context no longer services an I/O intensive workload, demoting the first system context to not have exclusive affinity to the one of the physical CPUs.

10. The method of claim 1, wherein the first system context is one of a physical network interface card (NIC) context configured to process packets that are received or a virtual NIC context configured to process packets that are being transmitted.

11. A non-transitory computer-readable medium comprising instructions executable by a host computer, the host computer having a plurality of physical central processing units (CPUs) that support execution of virtual computing instances, wherein the instructions, when executed, cause the host computer to perform a method for reducing latency and jitter of an input/output (I/O) intensive workload, the method comprising:
identifying a first system context which is a hypervisor context distinct from virtual CPU contexts associated with the virtual computing instances and which services the I/O intensive workload that runs in one of the virtual computing instances;
responsive to determining that a predefined maximum number of system contexts that can be assigned to have exclusive affinity to the physical CPUs has not been exceeded:
assigning the identified first system context to have exclusive affinity to one of the physical CPUs, wherein the assigning includes migrating running tasks and directing queued tasks and interrupt processing from the one of the physical CPUs to at least one other physical CPU of the physical CPUs, and increasing a CPU reservation associated with the host computer by one physical CPU; and
responsive to determining that the predefined maximum number of system contexts that can be assigned to have exclusive affinity to the physical CPUs has been exceeded:
not assigning the identified first system context to have exclusive affinity to any of the physical CPUs.

12. The non-transitory computer-readable medium of claim 11, wherein identifying the first system context that services the I/O intensive workload includes one of:
determining that a communication rate of the system context with a virtual CPU is greater than a predefined threshold or determining that a CPU load associated with the first system context is greater than a predefined threshold; or
determining that the first system context is related to a second system context which is a hypervisor context whose communication rate with the virtual CPU is greater than the predefined threshold or whose associated physical CPU load is greater than a predefined threshold.

13. The non-transitory computer-readable medium of claim 11, wherein identifying the first system context that services the I/O intensive workload includes:
receiving, from a driver, a notification of the first system context as being related to a virtual CPU; and
determining that a physical CPU load associated with the first system context is greater than a predefined threshold.

14. The non-transitory computer-readable medium of claim 11, wherein the first system context is identified based on an associated virtual device or virtual device queue being tagged as involved in an I/O latency-sensitive workload.

15. The non-transitory computer-readable medium of claim 11, wherein:
the CPU reservation associated with the host computer is a hypervisor resource pool allocation for the host computer; and
the hypervisor resource pool is used by a management application to make virtual computing instance placement decisions.

16. The non-transitory computer-readable medium of claim 11, wherein assigning the first system context exclusive affinity to the one of the physical CPUs places the first system context in a same last-level-cache (LLC) or Non-Uniform Memory Access (NUMA) domain as a virtual CPU to which the first system context communicates.

17. The non-transitory computer-readable medium of claim 11, the method further comprising, responsive to determining that a new latency-sensitive virtual computing instance cannot be placed as a result of the first system context's exclusive affinity to the one of the physical CPUs:
- demoting the first system context to not have exclusive affinity to the one of the physical CPUs; and
- assigning a virtual CPU of the new latency-sensitive virtual computing instance to have exclusive affinity to the one of the physical CPUs.

18. The non-transitory computer-readable medium of claim 11, wherein the first system context is one of a physical network interface card (NIC) context configured to process packets that are received or a virtual NIC context configured to process packets that are being transmitted.

19. A host computer system, comprising:
- a plurality of physical central processing units (CPUs) that support execution of virtual computing instances;
- a memory, wherein the memory includes an application program configured to perform operations for reducing latency and jitter of an input/output (I/O) intensive workload, the operations comprising:
   - identifying a first system context which is a hypervisor context distinct from virtual CPU contexts associated with the virtual computing instances and which services the I/O intensive workload that runs in one of the virtual computing instances,
   - responsive to determining that a predefined maximum number of system contexts that can be assigned to have exclusive affinity to the physical CPUs has not been exceeded:
      - assigning the identified first system context to have exclusive affinity to one of the physical CPUs, wherein the assigning includes migrating running tasks and directing queued tasks and interrupt processing from the one of the physical CPUs to at least one other physical CPU of the physical CPUs; and
      - increasing a CPU reservation associated with the host computer by one physical CPU, and
   - responsive to determining that the predefined maximum number of system contexts that can be assigned to have exclusive affinity to the physical CPUs has been exceeded:
      - not assigning the identified first system context to have exclusive affinity to any of the physical CPUs.

* * * * *